April 5, 1927.

I. H. ATHEY 1,623,458

VEHICLE

Filed Feb. 1, 1923

Inventor
Isaac H. Athey
Williams Bradbury
McCabb & Pierce Attys

April 5, 1927.

I. H. ATHEY 1,623,458

VEHICLE

Filed Feb. 1, 1923

Inventor
Isaac H. Athey

Patented Apr. 5, 1927.

1,623,458

UNITED STATES PATENT OFFICE.

ISAAC H. ATHEY, OF CHICAGO, ILLINOIS, ASSIGNOR TO ATHEY TRUSS WHEEL CO., OF CHICAGO, ILLINOIS, A CORPORATION OF ILLINOIS.

VEHICLE.

Application filed February 1, 1923. Serial No. 616,407.

My invention relates to improvements in vehicles, and is particularly concerned with vehicles of that type in which the load supporting wheels roll upon a flexible, endless track chain passing around the load supporting wheels.

The objects of my invention are:

First, to provide a vehicle of the character described comprising a track chain formed of a plurality of shoes, the adjacent edges of which are pivotally connected, in which novel means are provided for limiting the inward flexure of the track chain between the load supporting wheels;

Second, to provide a track chain, such as described, in which each shoe includes an inwardly extending truss arm, and novel means for connecting each truss arm with each of the adjacent truss arms so as to predetermine the inward flexure of the track chain between the load supporting wheels;

Third, to provide a vehicle comprising a track chain and load supporting wheels thereupon, said track chain comprising means for yieldingly resisting the straightening of the shoes in advance of the load supporting wheels;

Fourth, to provide a track chain, such as described, formed of a plurality of shoes having inwardly extending truss arms and collapsible means for connecting each of the truss arms with each adjacent truss arm, the collapsible means being so formed as to permit the free, initial movement of the shoes in straightening out in advance of the load supporting wheels, but yieldingly resisting the final movement of said shoes;

Fifth, to provide a track chain of the character described in which the means for yieldingly resisting the straightening of the shoes also acts as a buffer between adjacent shoes, and Sixth, to provide a construction, such as described, in which the means for resisting the straightening of the collapsible means are mounted upon the truss arms.

The above and other objects will appear as this description progresses, reference being had to the accompanying drawings, in which—

Throughout the several views, similar reference characters are used for referring to similar parts.

Figure 1:
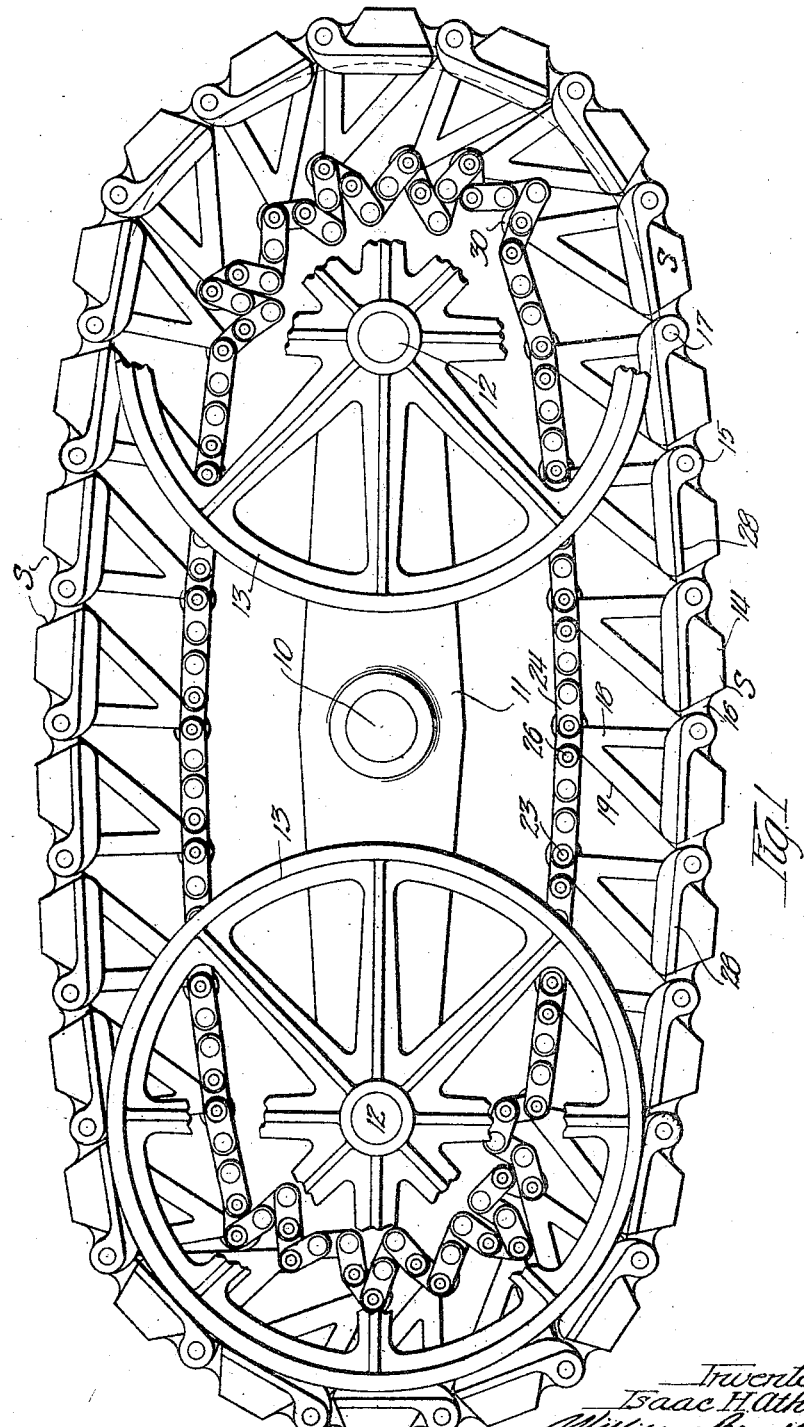
Figure 1 is a side elevation of a vehicle embodying my invention, portions thereof being broken away for the purpose of better illustration.

In the accompanying drawings, I have shown my invention as being embodied in a vehicle comprising a load supporting axle 10, upon which is pivotally mounted a beam 11. A shaft 12 is journaled in each end of the beam so that its ends project from each side thereof. A load supporting wheel 13 is secured to each of the projecting ends of the shafts 12.

Figure 4:
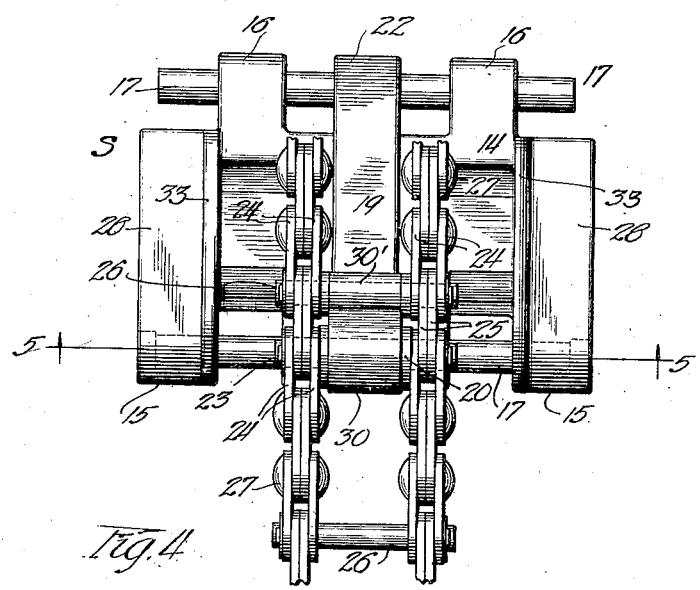
Figure 4 is a plan view showing certain features of construction of the shoes forming my improved track chain, and of the truss chain which connects the inner ends of the truss arms.

My improved track chain, upon which the load supporting wheels 13 roll, is formed of a plurality of shoes S, each of which comprises a channel-shaped tread member 14, from one edge of which project the hinge lugs 15, and from the other edge of which project the hinge lugs 16. The hinge lugs 16 are spaced apart, as shown in Figure 4, and the hinge lugs 15 are also spaced apart a sufficient distance for receiving the hinge lugs 16 of an adjacent shoe. Pintles 17 extending through aligned hinge lugs 15 and 16 provide means for pivotally connecting adjacent shoes so as to form a flexible track chain.

Figure 5:
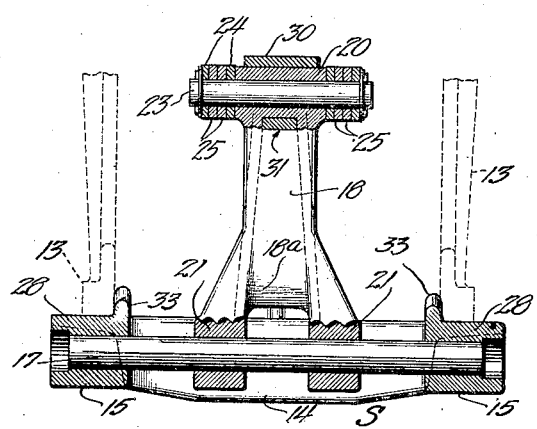
Figure 5 is a vertical transverse section taken on line 5—5 of Figure 4.

For the purpose of trussing the track chain, that is, preventing the inward flexure of that portion of the track chain which lies between the bottoms of the two pairs of load supporting wheels, and which bears the load, beyond a predetermined limit, I provide each shoe with a trussing member comprising the truss arm 18, which extends inwardly from the tread member in a plane substantially perpendicular to the plane of the tread member, and the truss arm 19 which extends inwardly from the opposite side of the tread member and inclines toward the truss arm 18. The inner ends of the two truss arms 18 and 19 are integrally joined, as shown in the drawings, and support a cross head 20 at their inner ends. The outer end of the truss arm 18 is bifurcated, as shown in Figure 5, and provided with two bearing blocks 21 through which one of the pintles 17 passes, and by which this portion of the trussing member is supported. The central portion of the truss arm 18 is formed of a web 18′ (see Figure 2), the lower end of which is inclined toward the center of the shoe, as shown at 18ᵃ, to provide a clearance for the truss arm 19 of the adjacent shoe when the shoes fold together in passing around the load supporting wheels.

The truss arm 19 is narrower than the truss arm 18, and carries at its lower end a single bearing block 22 which is received between the two bearing blocks 21 of an adjoining shoe, and is supported by one of the pintles 17.

For connecting the inner ends of the truss arms so as to limit the inward flexure of that portion of the track chain which carries the load, I provide a pair of truss chains lying on opposite sides of the truss arms and carried by pivot pins 23 extending through the cross heads 20. The ends of these pivot pins project on both sides of the cross heads and act as pivots for the pair of links 24 and the pair of links 25, the ends of which lie between the ends of the pair of links 24 and project in the opposite direction therefrom. A pin 26 extends through the other ends of the pairs of links 25 of both chains, and also through the ends of another pair of links 24, which, with other similar links, form a connection between two adjacent cross heads 20. The remaining links between these cross heads are connected by rivets 27 which extend through the links of one truss chain only (see Figure 4). In the construction illustrated herein, each truss chain between a pair of cross heads comprises four links which collapse, as shown in Figure 1, at the points where the track chains pass around the load supporting wheels.

I prefer to use my improved track chain in connection with a pair of load supporting wheels which roll upon bridges 28 projecting outwardly from each end of the shoes, the two pairs of load supporting wheels being so spaced apart as to permit the track chain to pass loosely around the load supporting wheels, as shown in Figure 1. This causes a certain amount of slack to develop and accumulate adjacent the lower sides of the wheels, as shown in Figure 1.

In some cases, it is desirable to make the track chain pass around the load supporting wheels in a comparatively tight manner, and when this construction is used, there is a certain amount of rise and fall of the leading load supporting wheel as it rolls upon and straightens out in advance of each succeeding shoe.

The construction thus far described permits the shoes to straighten out, but with a tight track chain, there is, as stated above, a tendency for the leading wheels to rise and fall as they pass upon and then drop with each succeeding shoe. It is desirable that the shoes straighten out as much as possible before the load is imposed thereon, and the truss chain thus far described will permit such straightening out, but in order to prevent the sudden fall of the load supporting wheels with the straightening out movement of the shoes, I provide a spring 30 for each shoe. One end of this spring passes through an opening 31 (see Figure 2) in the web 18′, and is bent outwardly, as shown at 32, to prevent this end of the spring from withdrawing from this opening. The spring curves around the cross head 20 on a larger radius than the radius of the cross head, so that when the shoes are folded together, as shown at the right in Figure 2, there is ample clearance between the spring 30 and the cross head 20. The other end of spring 30 is secured to the adjacent pivot pin by being curved around this pin, as shown at 30′ in Figure 2.

Figure 2:
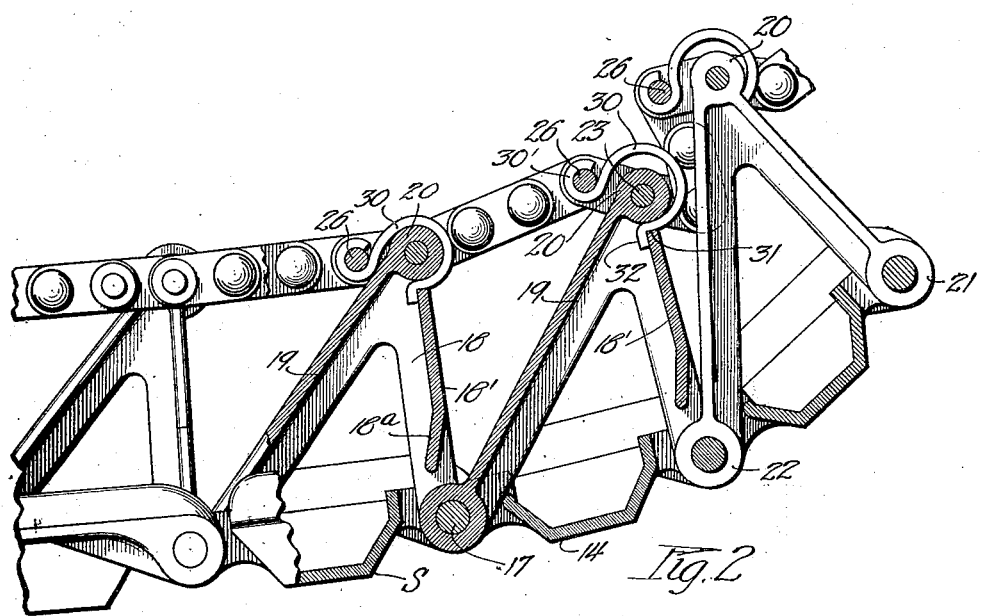
Figure 2 is a sectional detail of a portion of the track chain on an enlarged scale.
Figure 3:
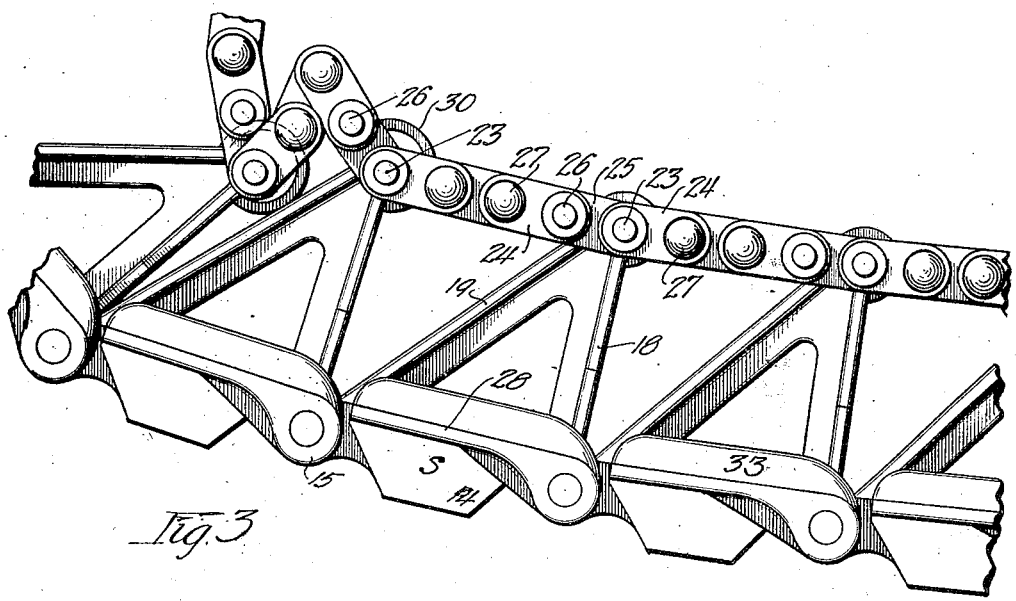
Figure 3 is a side elevation of a portion of the track chain on a similar scale.

From a consideration of the construction thus far described, it will be apparent that the initial movement of the shoes toward their straightened position will take place more or less freely while all of the links, except those connected with the pivot pins 23 and 26, are straightening out, but that when these links have been completely straightened, tension will then begin to be placed upon the spring 30 which will gradually be deflected to the position shown at about the central portion of Figure 2. In moving to the latter position from the former position, the length of the effective portion of the spring 30 gradually shortens so that it offers an increasing resistance to the straightening out of the truss chain. In this manner, the springs 30 tend to cushion the final movement of each succeeding shoe as it moves to its load supporting position. It will also be clear that the springs 30 tend to cause the trussing means to collapse inwardly when the shoes begin to fold together in passing around the trailing load supporting wheels.

It will be seen that when the springs 30 are not under tension, they act as spring or cushioning buffers between adjacent truss arms as the shoes fold together in passing around the load supporting wheels.

I prefer to use a trussing member of the shape disclosed herein, that is, one in which one of the truss arms extends inwardly from a point adjacent one edge of each shoe rather than to use a shoe in which the truss arm extends inwardly from a middle point of the tread member of the shoe, because, with the former construction, for the same height of truss arm, there is more room for the truss chain and the spring 30.

The flanges 33 extending transversely across each end of each shoe just inside of the bridges 28 provide means for aligning each succeeding shoe with the load supporting wheels.

While I have described the details of construction of the preferred embodiment of my invention, it is to be clearly understood that my invention is not limited to these details, but is capable of other adaptations and modifications within the scope of the appended claims.

Having thus described my invention, what I claim is new and desire to secure by Letters Patent of the United States is:

1. A track chain for a vehicle formed of a plurality of shoes arranged side by side, said shoes each comprising a tread member having a truss arm extending inwardly therefrom adjacent one side of said tread member, pintles for pivotally connecting said shoes to form a flexible track, a cross head carried by the inner end of each truss arm, a truss chain connecting the cross heads of adjacent shoes, said truss chain comprising a plurality of links having side pieces and pivot pins, and a spring carried by each cross head and connected with an adjacent pivot pin of the truss chain so as to offer increasing resistance to the straightening of the truss chain.

2. A track chain for a vehicle formed of a plurality of shoes arranged side by side, said shoes each comprising a tread member having a truss arm extending inwardly therefrom adjacent one side of said tread member, pintles for pivotally connecting said shoes to form a flexible track, a cross head carried by the inner end of each truss arm, a truss chain connecting the cross heads of adjacent shoes, and a spring carried by each cross head and connected with the truss chain so as to offer increasing resistance to the straightening of the truss chain.

3. A track chain for a vehicle comprising a plurality of tread members pivotally interconnected to form an endless tread chain, a truss arm projecting inwardly from each tread member, collapsible means for interconnecting the inner ends of said truss arms, and a member for each truss arm and cooperating with the adjacent truss arm and collapsible means to both cushion the straightening and assist in the collapsing of the collapsible means and to act as a cushion between adjacent truss arms.

4. A track chain for a vehicle formed of a plurality of shoes, each comprising a tread member and an inwardly extending truss arm, a plurality of connected truss links connecting each truss arm with each adjacent truss arm, and a spring mounted on each truss arm and connected with one link of an adjacent truss chain to permit the free initial straightening of said truss chain but to yieldingly resist the final straightening of said truss chain.

5. A track chain for a vehicle formed of a plurality of shoes, each comprising a tread member and an inwardly extending truss arm, a plurality of connected truss links connecting each truss arm with each adjacent truss arm, and a spring connected with one link of an adjacent truss chain to permit the free initial straightening of said truss chain but to yieldingly resist the final straightening of said truss chain.

6. A track chain comprising a series of tread shoes pivotally interconnected to form a flexible endless belt, a truss arm for each shoe extending inwardly therefrom, a truss chain composed of a series of pivotally interconnected links connecting the truss arms, and a resilient member carried by each truss arm and cooperating with a truss link at one side thereof to assist in the folding and to cushion the unfolding of the truss chain, said members lying in the path of an adjacent truss arm to be engaged thereby and serve as a cushioning buffer when the track folds.

7. A vehicle track chain comprising a tread chain composed of a pivotally connected series of shoes, a truss chain composed of a series of pivotally connected links, a truss arm associated with each shoe and connected to the truss chain, and a spring encircling each connection between a truss arm and the truss chain and cooperating with both to assist in the folding and to cushion the unfolding of the truss chain.

8. A track chain for a vehicle formed of a plurality of shoes, each comprising a tread member and an inwardly extending truss arm, a collapsible truss chain connecting each truss arm with each adjacent truss arm, and a spring carried by each truss arm and yieldingly resisting the straightening of an adjacent shoe, the said spring forming a buffer between adjacent shoes as said shoes fold together.

9. A track chain for a vehicle formed of a plurality of shoes, each comprising a tread member, pintles for pivotally connecting adjacent edges of said tread members, a truss arm extending inwardly from each tread member from a point nearer one of its pivoted edges than the other, a truss chain connecting each truss arm with each adjacent truss arm, and means carried by each truss arm for resisting the straightening of an adjacent shoe, said means comprising means acting as a buffer between the truss arm by which it is carried and an adjacent truss arm.

In witness whereof, I hereunto subscribe my name this 10th day of January, 1923.

ISAAC H. ATHEY.